United States Patent [19]
Ishida

[11] Patent Number: 6,049,696
[45] Date of Patent: Apr. 11, 2000

[54] RADIO SELECTIVE CALLING RECEIVER HAVING AN AUTO-DIALER FUNCTION

[75] Inventor: Takayasu Ishida, Shizuoka, Japan

[73] Assignee: NEC Corporation, Tokyo, Japan

[21] Appl. No.: 08/988,090

[22] Filed: Dec. 10, 1997

[30] Foreign Application Priority Data

Dec. 12, 1996 [JP] Japan ..................... 8-332446

[51] Int. Cl.⁷ .................................. H04Q 7/14
[52] U.S. Cl. .................. 455/31.2; 455/31.1; 340/825.44
[58] Field of Search ................ 455/31.2, 31.3, 455/564; 340/825.44, 311.1, 313

[56] References Cited

U.S. PATENT DOCUMENTS

| | | | |
|---|---|---|---|
| 5,099,507 | 3/1992 | Mukai et al. | 455/31.2 |
| 5,153,582 | 10/1992 | Davis | 340/825.44 |
| 5,280,516 | 1/1994 | Jang | 455/31.2 |
| 5,459,773 | 10/1995 | Hwang | 455/31.2 |
| 5,487,100 | 1/1996 | Kane | 455/31.2 |
| 5,630,207 | 5/1997 | Gitlin et al. | 455/38.4 |
| 5,631,635 | 5/1997 | Robertson et al. | 340/825.47 |
| 5,757,281 | 5/1998 | Schwendeman et al. | 340/825.55 |
| 5,838,252 | 11/1998 | Kikinis | 340/825.44 |
| 5,894,506 | 4/1999 | Pinter | 379/88.23 |

FOREIGN PATENT DOCUMENTS 7-50865  2/1995  Japan .

*Primary Examiner*—Dwayne D. Bost
*Assistant Examiner*—Erika A. Gary
*Attorney, Agent, or Firm*—Sughrue, Mion, Zinn Macpeak & Seas, PLLC

[57] ABSTRACT

In a radio selective calling receiver, a control section 103 has a DTMF signal generating section 103F that converts a transmit message into a dial tone signal to output the dial tone signal. A CPU section 103B of the control section 103 can transmit a message from the DTMF signal generating section 103F in the state that a message received from another receiver is read from a RAM section 103C and displayed on a display section 10, and at this time stores the receive message and the transmit message in association with each other in the RAM section 103C. When reading the receive message, the transmit message corresponding to the receive message is also displayed on the display section 107.

16 Claims, 2 Drawing Sheets

6,049,696

RADIO SELECTIVE CALLING RECEIVER HAVING AN AUTO-DIALER FUNCTION

BACKGROUND OF THE INVENTION

1. Field of the Invention

The present invention relates a radio selectiove calling receiver, in particular, a radio selective calling receiver having an auto-dialer function.

2. Description of the Related Art

In recent years, a radio selective calling receiver, for example, a pager has been remarkably developed and spread over people of wide ages. In the recent pagers, for the purpose of simplifying labor of making a call or transmitting a message, there are pagers having an auto-dialer function.

The pagers having the auto-dialer function of this type for enhancing the operability have been variously proposed. For example, Japanese Patent Unexamined Publication No. Hei 7-50865 (the title of the invention: paging receiver having an auto-dialer function) discloses a technique in which data which has been transmitted by an auto-dialer is stored in a memory. In this technique, when a message is received, transmit data which has been stored in the memory is compared with that message. If they are identical with each other, a response message bit is then set to "1". Subsequently, information indicating that a receive message is a response message to a transmitted message is stored in a receive message memory together with the receive message. In the radio selective calling receiver of this type, a porter (user carring the pager) can confirm whether a reply to the message transmitted by the auto-dialer function has been received, or not.

However, a porter cannot confirm a fact reverse to the above case, that is, whether a reply to the message which has been received from another receiver has been transmitted, or not. Accordingly, the above radio selection paging receiver still has inconvenience of this matter. In particular, at the present time when the radio selective calling receivers have spread, use of the paging receiver for enjoying conversation through messages between the respective radio selective calling receivers has been frequently made. However, in this use of the selective calling receiver, the transmitted contents are made simple because of limitations of characters to be transmitted. For that reason, the contents as received are not well understood when re-reading only the receive message later. Therefore, in the case of receiving a message from another receiver, it is desirable that a reply to the message is made at an early stage where what is meant by the received contents is understandable. From this viewpoint, a means for confirming whether a reply has been made, or not is desired.

SUMMARY OF THE INVENTION

The present invention has been made to solve the above problem, and therefore and an object of the present invention is to provide a radio selective calling receiver which is capable of confirming whether a reply to the message received from another receiver has been transmitted, or not.

In order to achieve the above object, a receiver according to the present invention includes a tone dialer that converts a message into a dial tone signal to output the dial tone signal, and a control section that stores in a memory the message transmitted by the tone dialer in association with a message which has been already received from another receiver.

It is preferable that the control section transmits the message in a state where the message received from another receiver is displayed on a display section, and the receive message and the transmit message are stored in the memory in association with each other.

Also, it is preferable that in the case where the control section is instructed to erase the receive message stored in the memory, the control section erases the receive message as well as the transmit message associated with the receive message.

BRIEF DESCRIPTION OF DRAWINGS

These and other objects, features and advantages of this invention will become more fully apparent from the following detailed description taken with the accompanying drawings in which.

In the drawings, the same reference numerals denote the same or like structural elements.

DETAILED DESCRIPTION OF THE PREFERRED EMBODIMENTS

Hereinafter, a description will be given in more detail of a preferred embodiment of the present invention with reference to the accompanying drawings.

Figure 1:
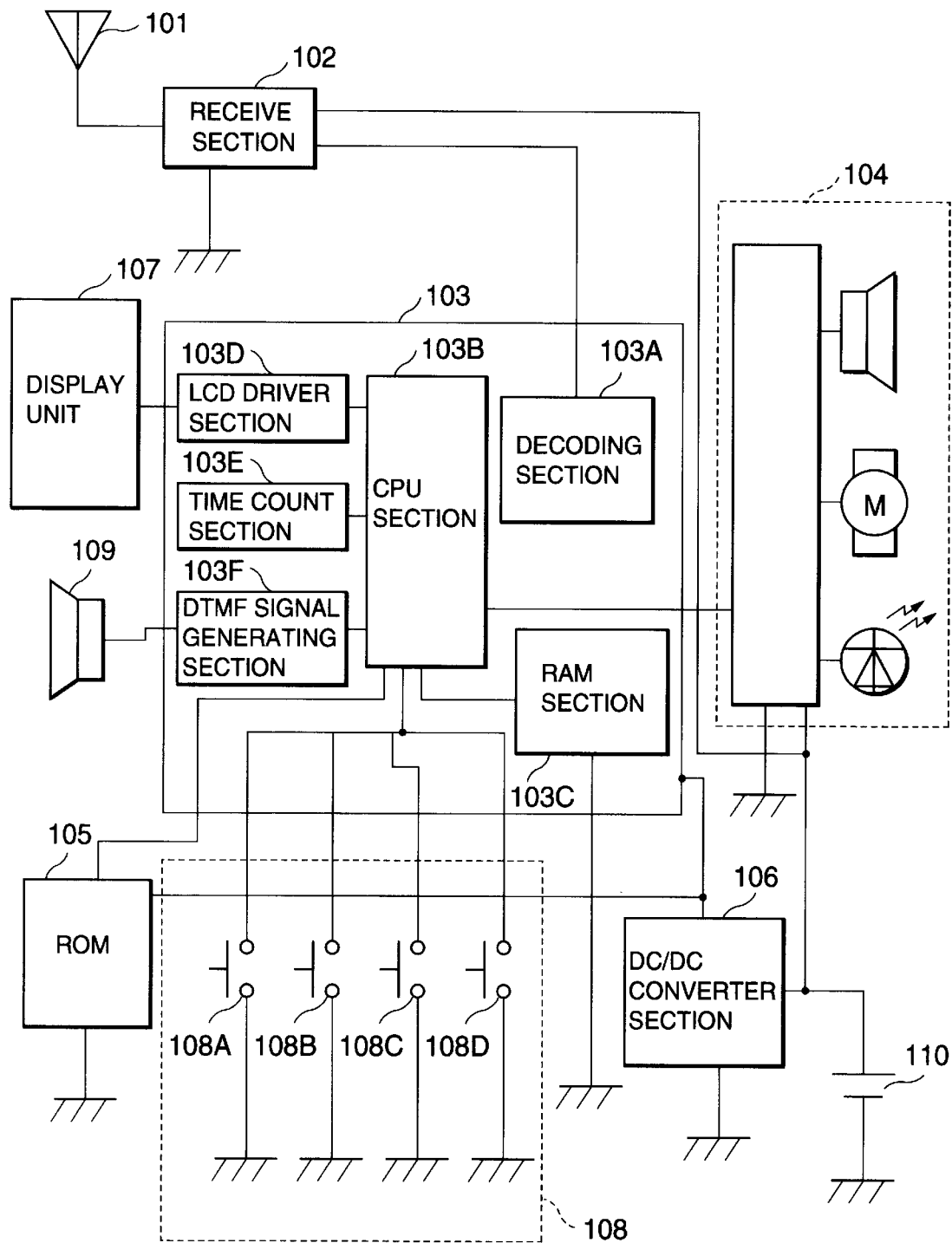
FIG. 1 is a block diagram showing a structure of a radio selective calling receiver according to a preferred embodiment of the present invention.

FIG. 1 is a block diagram showing a structure of a pager according to a preferred embodiment of the present invention.

In FIG. 1, a signal transmitted from a transmit side is received by an antenna 101. A radio signal is, for example, a signal of POCSAG format. A receive section 102 amplifies the radio signal received by the antenna 101 to demodulate an amplified signal.

A decoding section 103A provided within a control section 103 converts a signal demodulated by the receive section 102 into a digital signal. A central processing unit (CPU) 103B provided within the control section 103 compares the digital signal with paging No. of the pager which has been written in a read only memory (ROM) 105 in advance. If they are identical with each other, the CPU 103B conducts a receive announcement through an announcing section 104. The announcing section 104 includes at least one of a speaker, a vibrator and an LED. Also, the CPU 103B displays the received contents on a display section 107 through a liquid crystal display (LCD) driver section 103D provided within the control section 103. Moreover, the CPU 103B stores the received contents in a random access memory (RAM) section 103C provided within the control section 103.

The control section 103 conducts a variety of controls associated with times through a time count section 103E. Also, the control section 103 includes a DTMF signal generating section 103F as a means for performing a tone dialer function. In use of the tone dialer function, the contents to be transmitted is converted into a dial tone signal (DTMF signal: double tone multi-frequency signal) by the DTMF signal generating section 103F. Thereafter, a dial tone corresponding to the transmitted contents is outputted from the speaker 109. The transmitted contents which is transmitted by the DTMF signal generating section 103F is stored in the RAM section 103C prior to transmission.

Also, the pager according to this embodiment has a switch 108 which is made up of a plurality of switches 108A to 108D as an input means from the external, and a DC/DC converter section 106 and a battery 110 as a power supply.

Figure 2:
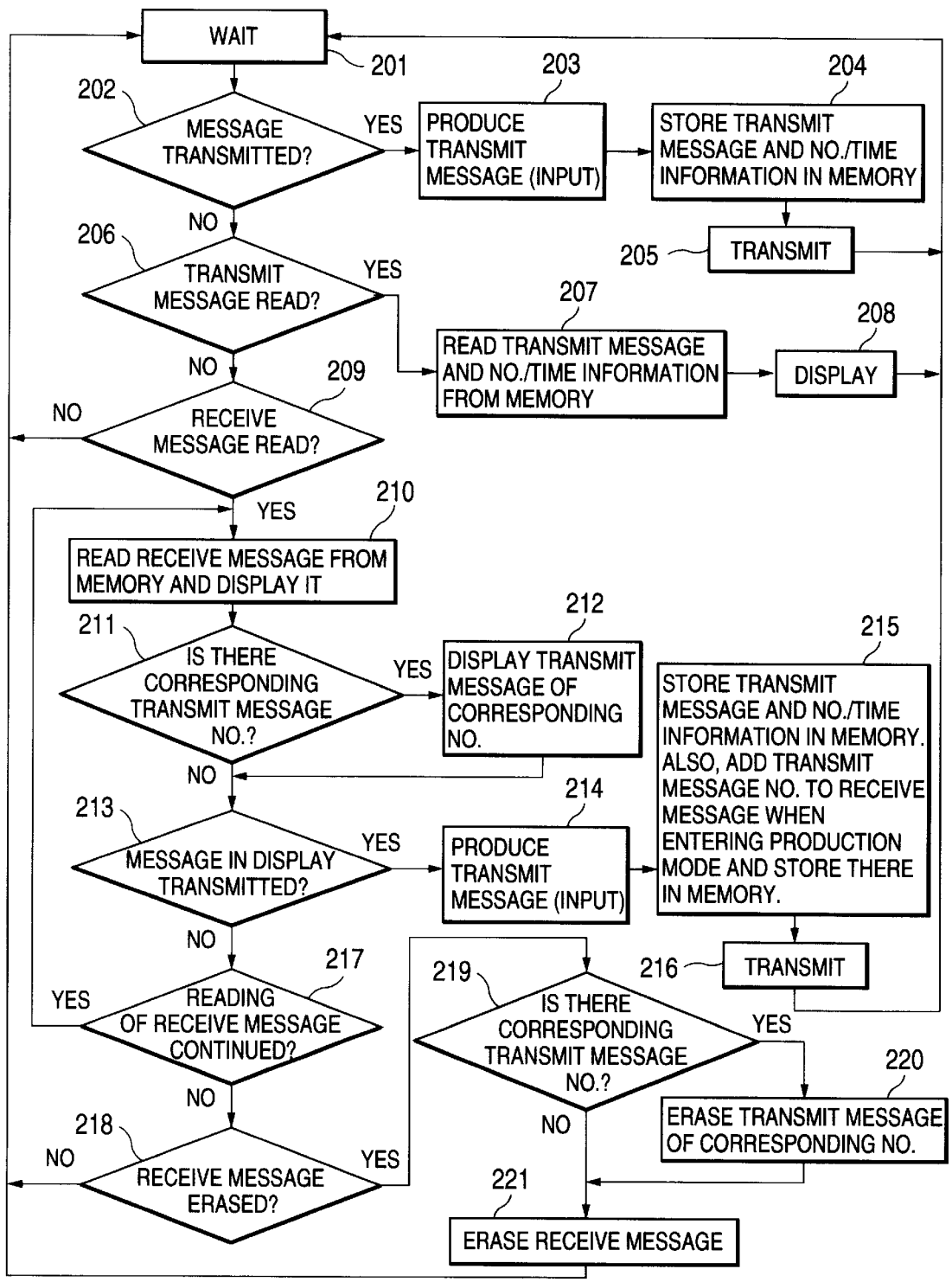
FIG. 2 is a flowchart illustrating an appropriate operation of the radio selective calling receiver shown in FIG. 1.

FIG. 2 is a flowchart showing the operation of the pager according to this embodiment. Hereinafter, the operation of the pager according to this embodiment will be described.

Upon turning the power supply on, the pager is brought into a wait state (step 201). In the wait state, a menu mode is obtained through switch operation. When a message transmit mode is selected in the menu mode, the message transmit mode is entered (step 202). In the case of transmitting a message, a user produces a message to be transmitted by use of the switch 108 (step 203). For example, the switch 108A is a decision switch, the switches 108B and 108C are scroll switches, and the switch 108D is a clear switch. The production of the message is made by use of those switches through a known method. The CPU 103B, after adding a message No. and production time information to the transmit message as produced, stores them in the memory 103C (step 204). As the message No., there is preferably used a count value representative of the number of the messages which is counted by a counter (not shown) provided within the CPU, etc. In other words, it is preferable that the message No. is numbered in correspondence with the order of the transmit messages. The production time information is based on a signal from the time count section 103E. After storing the transmit message, the message No. and the production time information in the memory 103C, the CPU 103B converts the transmit message into the dial tone signal through the DTMF signal generating section 103F to output the dial tone signal from the speaker 109 (step 205).

In the case where the user conducts the switch operation for requesting read of the transmit message, for example, in the case where a transmit message read mode is selected from the menu mode (step 206, yes), the CPU 103B reads the transmit message from the memory section 103C (step 207). Sequentially, the transmit message is displayed on the display section 107 through the LCD driver section 103D (step 208). In this display, it is preferable that the message No. and the production time information are displayed together with the message. The production time information may be representative of a time at which the message was produced or a time at which the message was actually transmitted.

On the other hand, in the case where the user conducts the switch operation for requesting read of the receive message, that is, in the case where a receive message read mode is selected from the menu mode (step 209, yes), the CPU 103B reads the receive message from the memory section 103C. Also, the CPU 103B displays the receive message on the display section 107 through the LCD driver section 103D (step 210).

In this example, in the case where the transmit message No. corresponding to the receive message as read is added, the CPU 103B reads the transmit message corresponding to the No. from the memory section 103C, and displays it on the display section 107 through the LCD driver section 103D (steps 211 and 212). A processing, for adding No. corresponding to the receive message will be described later.

In the case of conducting the transmission in correspondence with the receive message, after the receive message is displayed, the transmit message production mode is entered, and the user produces the transmit message (steps 213 and 214). The CPU 103B, after adding No. and the production time information to the transmit message produced, stores them in the memory section 103C, and also adds No. of the transmit message as produced this time to the receive message which has been displayed when the transmit message production mode has been entered and stores them in the memory section 103C (step 215).

In the case where that receive message is read later, as described above, the transmit message corresponding to No. which is added to the receive message is also simultaneously read and then displayed on the display section 107 (step 212). With this operation, the user can readily confirm whether the transmission corresponding to the receive message has been made, or not.

After storing the above transmit message and receive message, the CPU 103B converts the transmit message into the dial tone signal through the DTMF signal generating section 103F to output the dial tone signal from the speaker 109 (step 216).

In the case where the receive message is erased (step 217, no), it is judged whether No. of the transmit message corresponding to the receive message instructed to be erased has been added to that receive message, or not (steps 218 and 219). If the No. has been added thereto, after the transmit message of the corresponding No. is erased from the memory section 103C (step 220), the corresponding receive message is erased from the memory section 103C (221).

The above-mentioned embodiment is described with application of the pager, however, the present invention is not limited by or to the pager, and is applicable to other devices, appropriately, a portable telephone device, a portable information terminal having a communication function, etc.

As is described above, the present invention is advantageous in that it is possible to confirm whether a reply to the message received from another receiver has been transmitted, or not, whereby the radio selection paging receiver is useable with more facility.

Also, the present invention is advantageous in that since the transmit message and the receive message which is a base of the transmit message are displayed in association with each other, the user can enjoy conversation through exchange of the message.

Further, the present invention is advantageous in that in erasing a receive message from the memory, because a transmit message as transmitted in correspondence with the receive message is also erased together with the receive message, the overflow of the memory can be prevented.

While the invention has been described with reference to specific embodiments thereof, it will be appreciated by those skilled in the art that numerous variations, modifications, and embodiments are possible, and accordingly, all such variations, modifications, and embodiments are to be regarded as being with in the spirit and scope of the invention.

What is claimed is:

1. A radio selective calling receiver, comprising:
    a tone dialer for converting a first message to be transmitted into a dial tone signal to output the dial tone signal; and
    a control section having a memory for storing the first message in association with a second message which has been already received from another receiver in said memory, when the first message is transmitted as a reply to the second message, such that the first and second messages can be simultaneously read from said memory and displayed.

2. A radio selective calling receiver as claimed in claim 1, wherein said control section comprises means for transmitting the first message in a state where the second message received from another receiver is displayed on a display section;

wherein the second message and the first message are stored in the memory in association with each other.

3. A radio selective calling receiver as claimed in claim 1, wherein, in the case where said control section is instructed to erase the second message stored in said memory, said control section erases the second message as well as the first message associated with the second message.

4. A receiving device, comprising:

a receive section for receiving a message;

a memory for storing the message received by said receive section;

a display section for displaying the message stored in said memory;

a transmit section for transmitting a reply message to the message received by said receive section; and a control section for storing the receive message and the corresponding reply message in association with each other in said memory, when the corresponding reply message is transmitted by said transmit section, such that the receive message and the corresponding reply message can be simultaneously read from said memory and displayed.

5. A receiving device as claimed in claim 4, wherein when the reply message is transmitted said control section numbers the reply message and stores the reply message number together with the reply message in said memory, and said control section adds the reply message number to the corresponding received message and stores the reply message number together with the corresponding received message in said memory such that the receive message and the corresponding reply message can be simultaneously read from said memory using the reply message number so that the receive message and the corresponding reply message are displayed.

6. A receiving device as claimed in claim 5, wherein in displaying the receive message in said display section, when the reply message number is given to the receive message, said control section displays the reply message corresponding to the reply message number.

7. A receiving device as claimed in claim 5, wherein said control section enters a reply message production mode in response to the operation for entering the reply message production mode during displaying of the receive message.

8. A receiving device as claimed in claim 6, further comprising an operating section for conducting the operation of erasing the receive message.

9. A receiving device as claimed in claim 8, wherein the reply message is erased together with the receive message in response to the operation of said operating section.

10. A receiving device as claimed in claim 4, wherein said transmit means comprises a DTMF signal generating device.

11. A receiving device as claimed in claim 4, wherein said receiving device comprises a radio selection paging receiver.

12. A receiving device as claimed in claim 11, wherein said receiving device comprises a pager.

13. A method of controlling a message in a receiving device, said method comprising the steps of:

receiving a message;

storing the message as received;

displaying the message as received;

transmitting a reply message to the message as received; and storing the receive message and the corresponding reply message in a memory in association with each other, when the corresponding reply message is transmitted by the receiving device, such that the message as received and the reply message can be simultaneously read from said memory and displayed.

14. A method as claimed in claim 13, further comprising the steps of converting reply message into a DTMF signal; and transmitting the DTMF signal.

15. A method as claimed in claim 13, further comprising the steps of: giving a number to the reply message when transmitting the reply message; and storing the given number in correspondence with the receive message and the reply message.

16. A method as claimed in claim 15, wherein when there is a corresponding number when displaying the receive message, the reply message corresponding to the receive message is also displayed.

* * * * *